Jan. 13, 1959    C. H. PRESCOTT, JR., ET AL    2,868,636
PROCESS OF PREPARING URANIUM METAL
Filed June 12, 1945
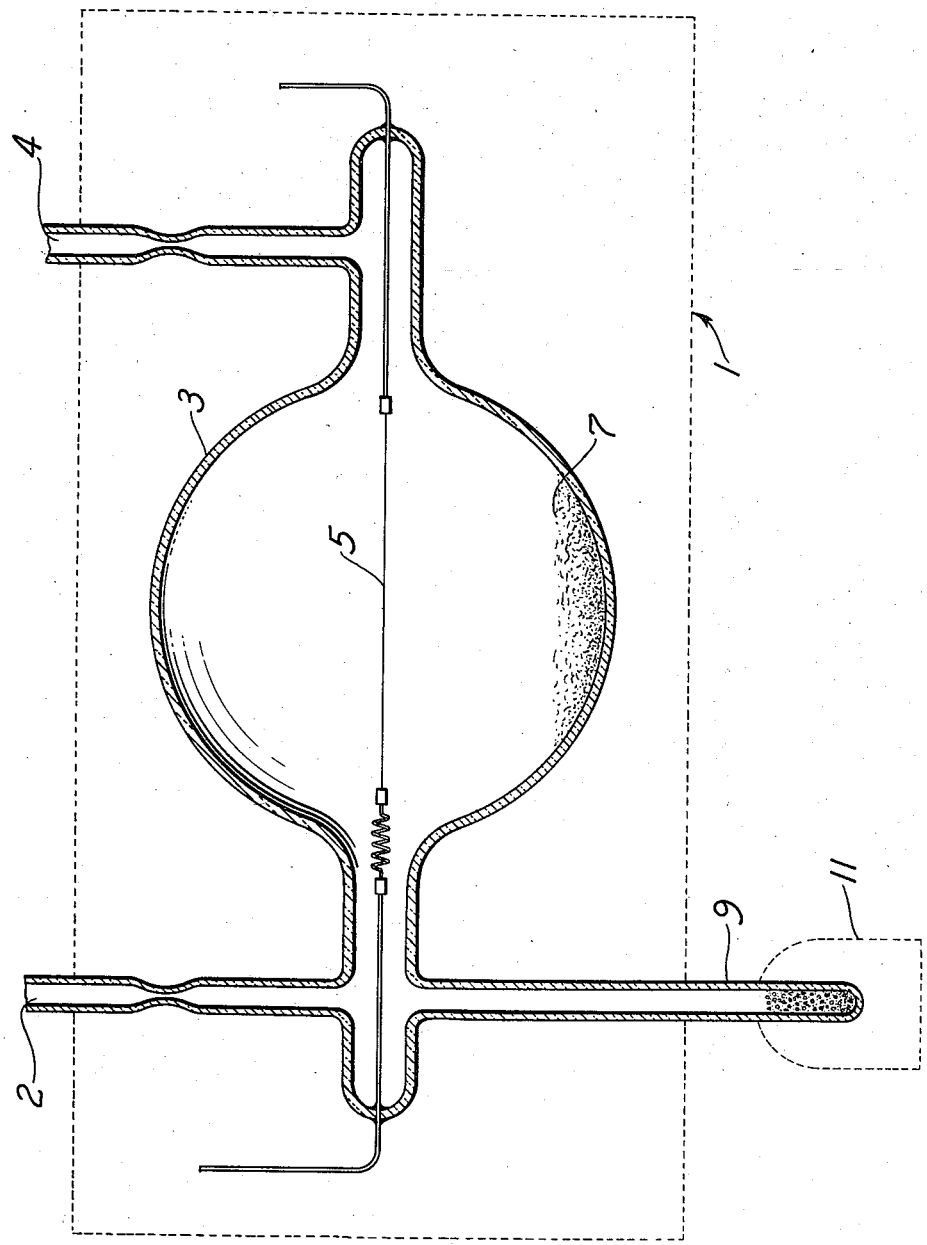
INVENTORS
CHARLES H. PRESCOTT JR.
BY FREDERICK L. REYNOLDS

United States Patent Office 2,868,636
Patented Jan. 13, 1959

2,868,636

PROCESS OF PREPARING URANIUM METAL

Charles H. Prescott, Jr., Berkeley, and Frederick L. Reynolds, San Francisco, Calif., assignors to the United States of America as represented by the United States Atomic Energy Commission Application June 12, 1945, Serial No. 599,069

8 Claims. (Cl. 75—84.1)

This invention relates to the purification of uranium and more particularly pertains to the production of uranium by decomposing a uranium iodide by contact with a refractory body heated to a high temperature.

It is an object of this invention to provide a new and improved method of producing uranium of extremely low oxygen content.

It is a further object of this invention to decompose a relatively volatile uranium iodide by contacting vapor thereof with a refractory material heated to incandescence.

Another object of the invention is to prepare uranium of relatively low oxygen content by reacting iodine with uranium containing a substantial amount of oxygen to produce uranium tetraiodide, and decomposing this iodide to substantially oxygen-free uranium metal by contacting the iodide in vapor phase with a refractory material at an elevated temperature.

Still another object of the invention is to convert uranium tetraiodide to uranium metal by contacting the iodide in vapor phase with a tungsten filament maintained at bright incandescence.

Another object of the invention is to contact iodine with impure uranium at an elevated temperature in an evacuated vessel to produce uranium tetraiodide, and thereafter contacting the iodide so produced with a tungsten filament maintained at a very high temperature within an evacuated vessel.

Still another object of the invention is to produce uranium metal from uranium tetraiodide vapor by contacting the vapor with a refractory filament maintained at a high temperature, preferably of the order of 1130° to 1600° C.

Still further objects of the invention as well as a more complete understanding thereof will be apparent from the description of the invention to follow, taken together with the accompanying drawing showing an apparatus suitable for carrying out the process of the invention.

In this drawing, 1 is an oven or furnace designed to maintain a temperature of the order of 500° C. Such an oven may be conveniently maintained at such a temperature by a suitable electric heating element (not shown). A closed reaction vessel 3 fabricated of pyrex glass or other suitable heat-resistant material, and from which air may be excluded, is maintained within and is adapted to be heated by the oven. Conduits 2 and 4 communicate with the vessel 3 and, in turn, with a suitable vacuum pumping system, not shown. A refractory filament 5, preferably of tungsten, is positioned between suitable electrodes sealed in the walls of the vessel 3. The electrodes are provided with leads extending to a suitable source of current, not shown, to enable the filament to be heated to a high temperature, preferably of the order of 1130° to 1600° C., this range of temperatures corresponding approximately to filament colors ranging from dull to bright incandescence. The reaction vessel 3 is provided with a charge 7 of more or less impure uranium. The vessel 3 is provided with a communicating extension or cell 9 extending to a point outside the oven 1 and adapted to contain iodine. The cell 9 is provided further with an arrangement 11 for heating and/or cooling the contents thereof as may be desired, whereby material disposed in the cell 9 may be brought to, and maintained at, a temperature different from that subsisting within the reaction vessel 3.

The following is an example of a process carried out in accordance with our invention. A quantity of more or less impure uranium turnings (in which oxygen is the principal impurity) was placed in the vessel 3, and a quantity of iodine was placed in the cell 9, the quantity of iodine employed being somewhat in excess of that necessary to convert the charge of metallic uranium to the tetraiodide. The reaction vessel was then pumped down to a relatively high vacuum and sealed off, after which it was arranged within the oven 1 and there heated to a temperature of approximately 490° to 510° C. The tungsten filament suspended in the vessel 3 was then heated to approximately 1500° C. by suitably adjusting the electric circuit that includes the filament. The iodine in the cell 9 communicating with the vessel containing the uranium was maintained at a temperature of approximately 0° C. by suitable adjustment of the temperature control device 11.

Under the temperature and pressure conditions described, the iodine in the cell 9 readily vaporizes and passes into the reaction vessel 3 where it reacts with the uranium turnings, thereby producing uranium tetraiodide. Under the temperature and pressure conditions obtaining in the reaction vessel 3, the relatively volatile uranium tetraiodide readily vaporizes at a fairly rapid rate. The tetraiodide vapor thus formed fills the vessel and comes into contact with the heated tungsten filament. Upon contact with the filament the uranium tetraiodide is decomposed and leaves a deposit of substantially oxygen-free uranium metal as a bead on the tungsten filament.

According to another variation of the invention, the process may be conducted generally in the manner already described but with this difference: Instead of completely sealing off the reaction vessel 3, thus causing the reaction to be conducted in a closed system, one or both of the conduits 2 and 4 may be left unsealed and in communication with the vacuum pumping system which is permitted to remain in operation during the course of the reaction, thereby maintaining the desired vacuum in the reaction zone while at the same time continuously withdrawing reaction gases from the system. In the event this modification is employed, it is preferable to include a restricted portion or a short capillary (e. g., of about 1 mm. diameter) in the pump-out conduit or conduits in order to decrease the rate of gas flow from the reaction vessel. For illustrative purposes the drawing shows such restrictions preformed in conduits 2 and 4, it being understood that in the event the reaction vessel is to be sealed off so that the reaction is conducted in a closed system, the restricted portions in the conduits 2 and 4 make it very convenient to seal off the communicating reaction vessel at the restricted portions.

The foregoing description of the process of our invention is by way of example, it being understood that numerous modifications of the procedure there described are contemplated as falling within the scope of our invention. For instance, the refractory body upon which the metallic uranium is deposited may be constructed of other materials such as tantalum, carbon, molydenum, platinum, and the like. Furthermore, to prevent or at lease minimize alloying of the freshly deposited molten uranium with certain of the materials (e. g., tungsten) that might be employed as the refractory body for deposition of uranium thereon, the refractory body (in filament, plate or other form) may be protected with a coat of thorium dioxide, zirconium oxide, or other suitable refractory oxide material, thereby permitting recovery of uranium not only in oxygen-free condition, but also in relatively pure metallic form substantially free of alloying constituents.

The temperature of the reaction vessel 3 containing the uranium may be varied from the lowest temperature that will cause the uranium and iodine to react at a practicable rate to form uranium tetraiodide to a temperature below that at which the uranium tetraiodide vapor will decompose substantially prior to contact with the hot refractory body or filament disposed within the evacuated vessel. In practice we have found such temperatures to be in the range of about 400° to 800° C.

The temperature of the refractory body itself must be sufficiently high as to cause relatively rapid decomposition of the uranium tetraiodide to uranium metal thereon, yet sufficiently low as to enable the deposited uranium to remain thereon as a bead. We have found that filament temperatures in the range of about 1130° to 1600° C., i. e., at or somewhat above the melting point of uranium, are particularly suitable.

A further variable to be considered is the temperature, or range of temperatures, applicable for the cell containing the iodine. On the one hand, the lower limit for this range of temperatures must be sufficiently high as to cause the iodine to volatilize at a practicable rate under the conditions of pressure maintained within the reaction vessel and the cell communicating therewith. On the other hand, the upper limit for this range is determined by the factor that the temperature maintained upon the iodine must not be sufficiently high as to cause an excessive partial pressure of iodine relative to that of the uranium tetraiodide within the reaction vessel, thereby substantially reducing the rate of decomposition of the uranium tetraiodide to uranium metal upon the hot refractory body. In practice we have found that the iodine cell or container should be kept at a temperature between about —20° C. and +20° C., with temperatures near the middle of this range preferred.

Although the employment of other total pressures within the system are contemplated as being within the purview of the aforementioned description, the reaction is preferably conducted while maintaining a total pressure within the system of not greater than about 1 mm. Hg, absolute. Care is taken by means of the evacuation to exclude oxygen or other gaseous or volatile oxide-forming material from the system during the process. Since such gases, particularly air, are substantially excluded during the process, the maximum total pressure in the reaction system will depend largely upon the partial pressures of the iodine and of the uranium tetraiodide present in the system at the temperatures obtaining therein. However, in the event that an inert gas is present in the system it will be apparent that the total pressure of the system may be somewhat higher without impairing the efficiency of the process. The total pressures employed are in any event well below atmospheric with the absolute pressure of the iodine being that which is produced when the iodine cell or container is maintained at a temperature between about —20° and +20° C. with the other conditions as indicated above. The low pressure preferably employed has a favorable effect upon the rates of volatilization of the iodine and of the production of vapor of uranium tetraiodide for contacting the hot refractory body, other conditions remaining the same.

In the foregoing, it will be noted that we have provided a process for producing uranium of low oxygen content by contacting a uranium iodide, formed from the more or less crude uranium to be purified, with a refractory body heated to an extremely high temperature.

In the example and discussion of our process we have included the step of producing the uranium tetraiodide from crude uranium turnings placed in the same vessel as the refractory body. It will be understood, of course, that uranium tetraiodide from any other source, e. g., preformed tetraiodide, may be treated in accordance with our invention to produce oxygen-free metallic uranium. These and other modifications of our method are included within the scope of our invention which is to be limited only as indicated by the appended claims.

We claim as our invention:

1. The process of producing oxygen-free uranium metal comprising contacting iodine vapor derived from a stoichiometric excess of iodine maintained at a temperature of the order of —20° C. to 20° C. with crude uranium in a reaction zone maintained at a temperature in the range of 400° C. to 800° C. and at subatmospheric pressure to produce a vaporous mixture of uranium tetraiodide with said iodine vapor, and simultaneously contacting said vaporous mixture with a tungsten filament heated to bright incandescence and disposed within said zone to form a molten mass of oxygen-free uranium thereon.

2. The process of producing oxygen-free uranium metal comprising contacting iodine vapor derived from a stoichiometric excess of iodine maintained at a temperature of the order of —20° C. to 20° C. with crude uranium at a temperature of the order of 400° to 800° C. to produce a vaporous mixture of uranium tetraiodide with said iodine vapor, and simultaneously contacting said vaporous mixture with a tungsten filament heated to a temperature of 1130° to 1600° C. in a reaction zone in communication with said crude uranium and said source of iodine vapor while maintaining a partial vacuum upon the entire system, whereby molten oxygen-free uranium is deposited upon said filament.

3. The process of producing oxygen-free uranium metal comprising contacting iodine vapor derived from a stoichiometric excess of iodine maintained at a temperature of —20° C. to 20° C. with crude uranium in a reaction zone maintained at a temperature of 400° C. to 800° C. to produce a vaporous mixture of uranium tetraiodide with said iodine vapor, and simultaneously contacting said vaporous mixture with a tungsten filament heated to a temperature of 1130° to 1600° C. disposed within said zone in order to decompose said vaporous tetraiodide and deposit molten oxygen-free uranium metal upon said filament while maintaining a partial vacuum upon the entire system by means of continuous pumping.

4. The process as in claim 3, wherein said iodine is maintained at a temperature of about 0° C.

5. The process as in claim 3, wherein said iodine is maintained at a temperature of about 0° C. and said reaction zone is maintained at a temperature of about 490° to 510° C.

6. The process as in claim 1, wherein said filament is heated to a temperature of 1130° C. to 1600° C.

7. The process as in claim 1, wherein said iodine is maintained at a temperature of —20° to 20° C., said reaction zone is maintained at about 490° to 510° C. and said filament is heated to a temperature of 1130° C. to 1600° C.

8. The process as in claim 3 wherein the partial vacuum which is maintained in the entire system by said continuous pumping is less than 1 mm. Hg absolute.

References Cited in the file of this patent

UNITED STATES PATENTS

| | | |
|---|---|---|
| 1,306,568 | Weintraub | June 10, 1919 |
| 1,671,213 | Van Arkel et al. | May 29, 1928 |
| 1,709,781 | De Boer et al. | Apr. 16, 1929 |
| 2,393,264 | Rentschler et al. | Jan. 22, 1946 |